US005762796A

United States Patent [19]
Zraik

[11] Patent Number: 5,762,796
[45] Date of Patent: Jun. 9, 1998

[54] COLOR CODED SIDE SEAM LABEL FOR FILTER ELEMENT

[75] Inventor: Edward M. Zraik, Sylvania, Ohio

[73] Assignee: Parker-Hannifin Corporation, Cleveland, Ohio

[21] Appl. No.: 799,972

[22] Filed: Feb. 14, 1997

Related U.S. Application Data

[60] Provisional application No. 60/013,488, Mar. 15, 1996.

[51] Int. Cl.$^6$ .............................. B01D 27/08; B01D 27/06
[52] U.S. Cl. ........................... 210/493.1; 210/493.5; 55/498; 55/500; 55/502; 55/521; 283/81; 283/98; 283/114; 493/961; 156/DIG. 5; 156/DIG. 47
[58] Field of Search ........................... 210/446, 493.1, 210/493.2, 493.5; 55/498, 500, 502, 521; 283/81, 98, 114; 493/961; 156/DIG. 5, DIG. 19, DIG. 20, DIG. 47

[56] References Cited

U.S. PATENT DOCUMENTS

| | | |
|---|---|---|
| 3,591,010 | 7/1971 | Pall et al. |
| 3,865,919 | 2/1975 | Pall et al. |
| 3,867,294 | 2/1975 | Pall et al. |
| 4,184,966 | 1/1980 | Pall |
| 4,392,958 | 7/1983 | Ganzi et al. ............. 210/493.2 |
| 4,512,892 | 4/1985 | Ganzi et al. ............. 210/493.2 |
| 4,588,464 | 5/1986 | Miyagi et al. |
| 4,647,373 | 3/1987 | Tokar et al. |
| 4,663,041 | 5/1987 | Miyagi et al. |
| 4,735,720 | 4/1988 | Kersting |
| 4,906,371 | 3/1990 | Miller .................... 210/493.2 |
| 5,108,709 | 4/1992 | Bugar et al. ............. 210/446 |
| 5,192,424 | 3/1993 | Beyne et al. |
| 5,238,307 | 8/1993 | Mooney et al. .......... 206/459.5 |
| 5,360,650 | 11/1994 | Grimes |

FOREIGN PATENT DOCUMENTS

| | | |
|---|---|---|
| 0 062 867 | 10/1982 | European Pat. Off. |
| 0 374 280 | 6/1990 | European Pat. Off. |
| WO 94/22551 | 10/1994 | European Pat. Off. |
| 3126850 A1 | 3/1982 | Germany |
| 2 299 031 | 9/1966 | United Kingdom |

OTHER PUBLICATIONS

International Search Report for PCT Case No. PCT/US97/03083.

*Primary Examiner*—W. L. Walker
*Attorney, Agent, or Firm*—Christopher H. Hunter

[57] ABSTRACT

A filter element includes a cylindrical support tube, pleated filter material surrounding the support tube, and end caps at either end of the filter material. The filter material has pleat sidewalls along the opposed side edges of the material which are located in surface-to-surface contact with each other. A mass of adhesive is disposed axially along the filter element in the pleat cavities defined in part by the adjacent pleat sidewalls. The adhesive entirely fills the cavities and encapsulates the pleat sidewalls along the side edges to retain the side edges together. Color and/or alpha-numeric character(s) representing a structural or functional characteristic of the filter element (e.g., efficiency, chemical resistivity, model number, trade name, etc.) are included with the mass of adhesive. The color can be introduced into the adhesive as a dye or pigment before curing, or can be applied as a dye or a paint to the exterior surface of the adhesive after the adhesive is cured. The alpha-numeric characters can be laser-etched into the exterior surface of the cured adhesive. The color and alpha-numeric characters can also be incorporated into a strip of mesh-type material disposed along the adhesive. In this aspect, warm (uncured) adhesive can wick through the material to form a transparent protective barrier for the exterior surface of the strip. Alternatively, the strip could be applied to the adhesive after the adhesive is cured with an additional mass of adhesive.

38 Claims, 3 Drawing Sheets

COLOR CODED SIDE SEAM LABEL FOR FILTER ELEMENT

This application claims the benefit of U.S Provisional application No. 60/013,488, filed Mar. 15, 1996.

FIELD OF THE INVENTION

The present invention relates generally to fluid filters and their manufacture, and more particularly to a side seam seal for a cylindrical filter element.

BACKGROUND OF THE INVENTION

One known type of filter element for filtering fluid comprises a sheet of filter material folded to form a plurality of parallel pleats or folds. The side edges of the sheet are brought together in a cylindrical configuration with the pleats extending in the axial direction of the cylinder. The side edges of the sheet are then joined together to retain the filter material in the cylindrical form. The filter material can be coreless, i.e., self-supporting, and received over a cylindrical support tube integral with the filter housing; or can include a rigid perforated core which supports the inner edges of the pleats. End caps are typically received on either end of the cylindrical filter element, with appropriate adhesive being applied between the end caps and the filter element.

Conventional methods for joining the side edges of the sheet together include coating one or both of the side edges with adhesive, bringing the side edges into contact, and then applying heat to set the adhesive. Certain references have acknowledged the difficulties in sealing the side seam of a cylindrical pleated filter element so as to prevent leak paths from forming when the filter element is under pressure. U.S. Pat. No. 4,735,720, for example, describes a technique whereby the opposed side edges of the filter element are inserted within the open ended cavity of an elongated U-shaped mold. The mold includes a pair of generally parallel sidewalls connected by a rounded bottom, and the contacting side edges of the filter element are spaced from the bottom of the filter element. A synthetic resin is introduced into the mold to encapsulate the side edges of the filter element. This reference describes a bar of resin projecting inwardly toward the core of the filter element, or outwardly away from the core, depending upon the direction of the pleats along the side edges of the filter material.

Another technique is shown in U.S. Pat. No. 3,867,294 whereby the opposite ends of a sheet of filter material are folded over with outer and inner end surfaces in adjacent relation. The portions of the sheet adjacent the ends have one surface in face-to-face closely abutting contact extending to the edges of the sheet, while the next adjacent portions of the sheet have another surface opposite each other, extending beyond the edges of the end portions of the sheet, but spaced apart by the folded-over abutting sheet ends. The opposed surfaces of the spaced-apart sheet portions and the ends of the sheet define a space therebetween. A bonding agent, such as a ribbon of adhesive, is introduced into the space for bonding the sheets together at the (abutting) end edges and at the opposed (spaced-apart) surfaces of the sheet.

A still further technique is shown in U.S. Pat. No. 4,184,966 whereby a self-supporting channel strip of thermoplastic resinous material is folded over the outer ends of the abutting side edges of the filter material. The resulting U-shaped strip is bonded to the filter upon heating.

While the above structures might be appropriate for certain applications, it is believed that there is a demand in the industry for a further improved side seam seal which prevents leak paths from forming under fluid pressure, and which is relatively simple to manufacture. Moreover, it is believed that there is a demand in the industry for a filter element with a side seam seal which provides additional functions for the filter element, such as a location where important structural and functional information can be provided. The structural and functional information can be used to facilitate selecting and identifying a particular filter element for an appropriate application.

It is believed that conventional filter elements have heretofore relied upon such techniques as color stripes applied circumferentially around the filter element by spraying with dyes or paints, and/or by stamping or marking alpha-numeric information (such as model numbers, trade/designation marks, etc.) on the end caps of the element. The dyes or paints, however, can be applied in such a manner that they can degrade or wear-off during use and can enter the filtrate, while marking the end caps with such information can be difficult and time-consuming to accomplish. The marking can also be difficult for the user to read, particularly with some of the smaller filter elements. In any case, it is believed that the side seam seal for the filter elements otherwise has not been used in such a manner to facilitate selecting and identifying an appropriate filter element for a particular application. In addition, applicants believe that the side seam seal has typically had a rather unsightly and unfinished appearance because of the manner in which the adhesive is applied to the side edges of the filter material.

SUMMARY OF THE INVENTION

The present invention provides a novel and unique filter element, and a technique for manufacturing the filter element, whereby the side seam seal of the filter element includes information which facilitates selecting and identifying an appropriate filter element for a particular application, and which is also neat and finished in appearance. The side seam is relatively simple to manufacture and prevents leak paths from forming across the seal when the filter element is under pressure.

According to the present invention, the filter element comprises a sheet of pleated filter material which is preferably disposed around a central, perforated support core, but which can also be self-supporting. The pleats of the filter media have open ends which are spaced away from the core, closed or bight ends adjacent the core, and sidewalls extending between the open ends and bight ends. The open ends, bight ends and sidewalls of each pleat define pleat cavities around the filter element. The outwardly-directed surface of the sidewall along one of the side edges of the filter element is disposed in adjacent, surface-to-surface contact with the outwardly-directed surface of a sidewall along the other side edge of the filter material. The two adjacent sidewalls preferably are only partial sidewalls, that is, the side edges of these sidewalls do not extend radially outward as far as the other sidewalls around the filter element. A band or ribbon of adhesive is applied axially along the filter element in the pleat cavities defined by the adjacent partial sidewalls. The adhesive entirely fills both partial pleat cavities and encapsulates the side edges of the adjacent side walls to retain the side edges together. The adhesive also has a smooth exterior surface.

The selecting and identifying information is provided on the exposed exterior surface of the adhesive. The information can comprise a color, alpha-numeric character(s), and/or other means for labeling a filter element. The information is preferably easily incorporated with the adhesive. For example, according to one form of the invention, a dye or pigment is introduced into the adhesive before the adhesive is applied to the side edges of the filter material. The colored adhesive is then applied to the filter element and cured (or set). The color of the adhesive corresponds to a characteristic of the filter element, such as the efficiency rating of the element. Alpha-numeric characters can then be imprinted on the exterior surface of the colored adhesive. The characters can represent other characteristics of the filter element such as the model number, trade/designation mark, etc., of the element. The alpha-numeric characters can be imprinted using conventional techniques such as laser etching. The color and/or alpha-numeric characters make it simple for a user to easily locate a particular filter element for an appropriate application.

According to another form of the present invention, after the adhesive is applied to the side edges of the filter material, a strip of material is applied along the length of the adhesive before the adhesive is cured. The strip is visible along the exterior of the filter element and can be marked with the selecting and identifying information, such as by applying a color to the strip, or by marking the strip with alpha-numeric characters corresponding to functional and structural characteristics for the filter element. The strip is preferably formed of a mesh-type material which allows the liquid adhesive to wick through the strip and form an exterior seal or barrier. When the adhesive is cured, the exterior seal or barrier prevents the color and/or alpha-numeric characters on the strip from being worn-off or degraded during use.

In either case, the novel and unique side seam seal of the present invention facilitates readily selecting and identifying an appropriate filter element for a particular application, and has a neat and finished appearance.

Other features and advantages of the present invention will become further apparent upon reviewing the following specification and attached drawings.

DETAILED DESCRIPTION OF THE PREFERRED EMBODIMENT

Figure 1:
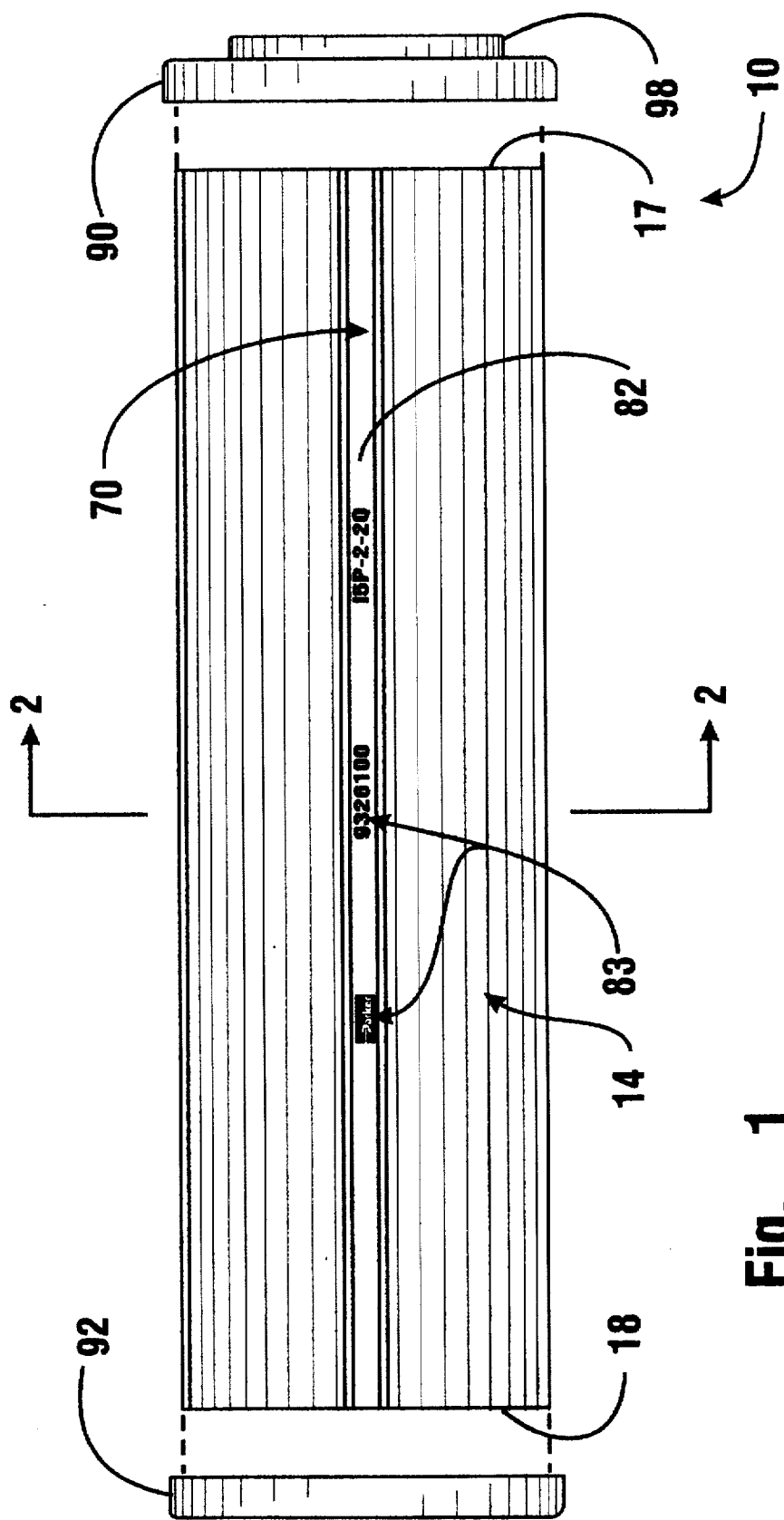
FIG. 1 is a side view of a filter element constructed according to the principles of the present invention.
Figures 2, 2A:
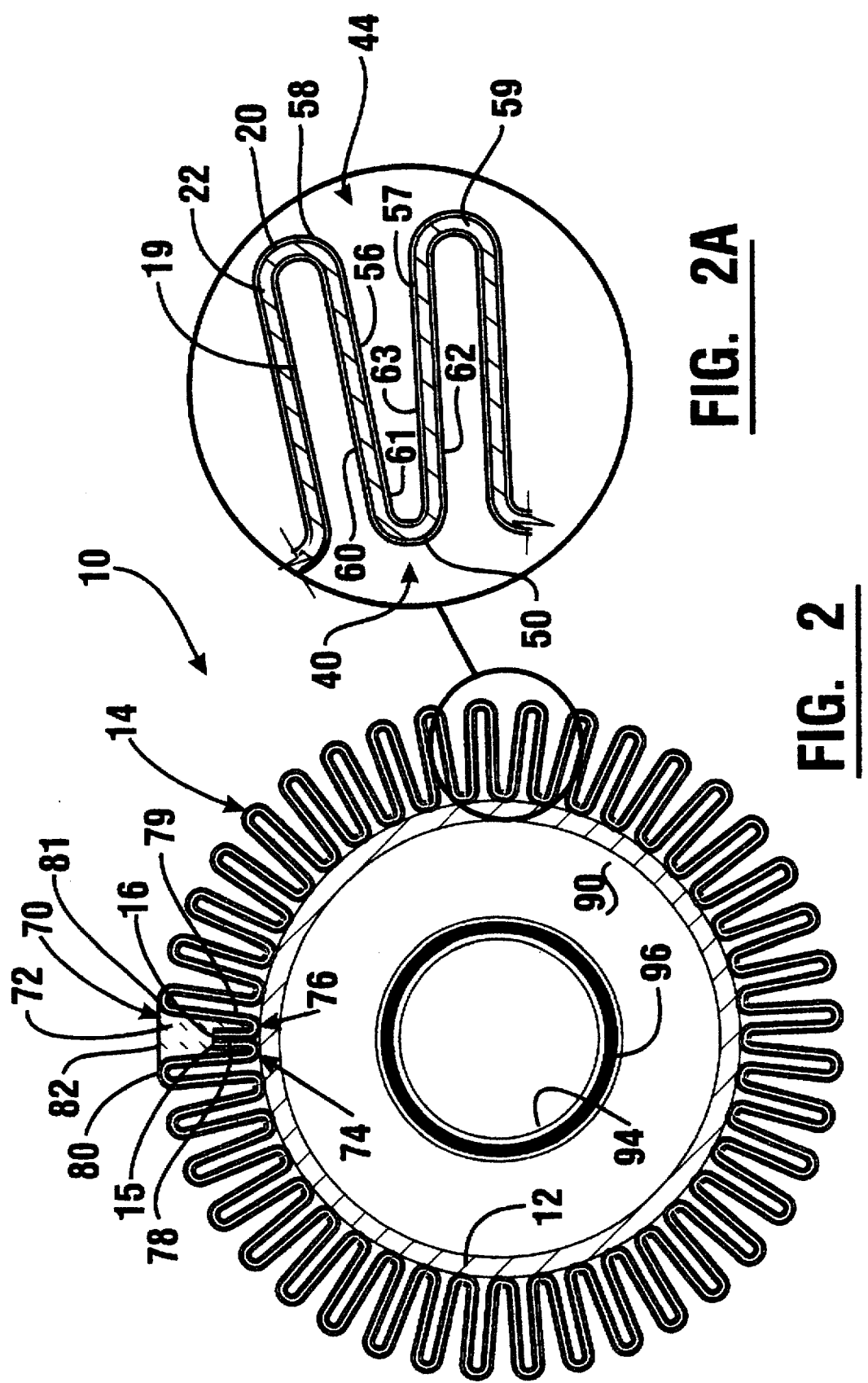
FIG. 2 is a cross-sectional side view of the filter element taken substantially along the plane described by the lines 2—2 of FIG. 1.
FIG. 2A is an enlarged cross-sectional view of a portion of the filter element of FIG. 2.

Referring to the drawings, and initially to FIGS. 1, 2, and 2A a filter element constructed according to the principles of the present invention is indicated generally at 10. The filter element 10 includes an inner cylindrical support tube or core 12 having a series of perforations or openings along its length. The number of perforations is chosen so as to allow fluid to flow substantially unimpeded through the tube, yet provides sufficient rigidity for the tube. The support tube is formed from appropriate material (e.g., metal or plastic) using conventional techniques known to those skilled in the art.

A filter material, indicated generally at 14, surrounds the inner support tube. The filter material has side edges 15, 16 (FIG. 2) and upper and lower end edges 17, 18 (FIG. 1). The filter material preferably has a multi-layered structure with an inner support layer 19 of a thin wire mesh, an outer support layer 20 of a thin wire mesh, and an intermediate filtration layer 22 interposed between the inner layer 19 and outer layer 20. The intermediate filtration layer 22 preferably is a fiberglass sheet material having pores extending from surface to surface, and is resin-impregnated. However, in a broader sense, the filter material can have any of many-known structures for the pleated filter elements, such as a single layered structure with a single filtration layer, or multiple layered structures with two or more filtration layers. In addition, the filter material can be formed from any of the known materials, such as fibers of papers and like sheet materials (textile fabrics, woven and non-woven fibrous layers, etc.). The filter material and structure of the filter material are chosen depending upon the particular application for the filter element, and are preferably formed using conventional techniques known to those skilled in the art. Finally, the filter material can be formed from a material or have a structure which is sufficiently rigid to be self-supporting when folded in cylindrical form. If such is the case, then support tube 12 may not be necessary.

The filter material 14 described above is preferably pleated. The techniques for forming the pleats in the filter material are known to those skilled in the art, and can include hand-forming, or machine forming by a conventional textile pleater. The pleats form a series of outwardly-opening pleat cavities around the circumference of the filter element. For example, one pleat, indicated generally at 40, defines an outwardly-opening pleat cavity 44. Each pleat cavity is defined by a bight (closed) end and sidewalls which extend outwardly away from the bight end toward me open end of the pleat cavity. For example, pleat cavity 44 is formed by an inner bight end 50 and opposing sidewalls 56, 57 which extend outwardly from bight end 50 toward pleat peaks 58 and 59. Pleat peaks 58 and 59 form the open end of the pleat cavity. Sidewalls 56, 57 are generally parallel to one another and are spaced apart a distance sufficient to allow fluid flow therebetween. Each sidewall includes an outwardly-directed surface and an inwardly-directed surface. For example, sidewall 56 includes an outwardly-directed surface 60 and an inwardly-directed surface 61, while sidewall 57 includes an outwardly-directed surface 62 and an inwardly-directed surface 63.

The filter material is preferably wrapped around the inner support tube such that one side edge 15 of the filter material abuts and is adjacent to the other side edge 16. The outwardly-directed surface of sidewall 78 of pleat 74 is preferably disposed in adjacent, surface-to-surface contact with the outwardly-directed surface of sidewall 79 of pleat 76. The side edge 15 and side edge 16 define a seam around the filter material. A side seam seal, indicated generally at 70, extends along this seam axially along the length of the filter element. Side seam seal 70 preferably comprises a mass of adhesive 72 applied in a band or ribbon across one or more of the pleats adjacent to the respective side edges of the filter element. Specifically, referring to FIG. 2, adhesive 72 is preferably disposed within the cavity of a first pleat, indicated generally at 74, which includes side edge 15 of the filter material; and within the cavity of a second pleat, indicated generally at 76, which includes side edge 16 of the filter material. Preferably, sidewalls 78 and 79 are only partial sidewalls, that is, the side edges 15, 16 of these sidewalls only extend a portion of the distance radially outward from the bight ends to the peaks of the pleats (such as pleat peaks 80 and 81), with the side edges 15, 16 substantially flush with one another. Preferably, the sidewalls extend outwardly about one-half the total radial distance between the bight ends and the peaks of the other pleats. Partial sidewalls 78 and 80 can be formed by trimming a portion of the pleats adjacent the side edges of the filter material, as necessary. Alternatively, although less preferred, one (or more) pleats along one of the side end of the filter material could overlap one (or more) pleats along the other side end of the filter material. In this case, at least one of the sidewalls, and specifically the sidewall of the outer overlapping pleat adjacent the side end, is a partial sidewall, such that a portion of the underlying sidewall is exposed.

In either case, the cavities of adjacent pleats 74 and 76 are filled with adhesive such that the adhesive adhesive fills the entire pleat cavities from sidewall to sidewall, and preferably up to the level of the pleat peaks 80, 81, such that a smooth, uninterrupted exterior surface 82 between the pleat peaks is provided. The adhesive could also fill the cavities up to a level which is slightly higher (or lower) than the pleat peaks, depending upon the particular application, as long as a smooth exterior surface is provided. In the filter structure described above, the adhesive fills the pleat cavities to substantially cover the outer wire mesh layer 20 on the pleat peaks of the adjacent pleats 74 and 76. In the preferred structure, the adhesive overlaps the seam between the adjacent side edges 15, 16 to encapsulate these edges. In the less preferred structure (with overlapping pleats), the adhesive only encapsulates the side edge of the outer pleat. In either case, the adhesive effectively prevents leak paths from forming along the seam, even with multiple layers of filter material.

The adhesive is preferably a conventional, heat-curable epoxy adhesive, a "hot melt" adhesive, or can be a polyurethane-based adhesive, depending upon the particular filter application. The adhesive is generally chosen taking into account i) the operating environment, ii) whether the adhesive is a one-part or two-part adhesive, iii) the cost of the adhesive, and iv) the adhesive curing requirements. In any case, the type of adhesive appropriate for a particular application can be easily determined by one of ordinary skill in the art using simple experimentation. The adhesive is preferably applied using conventional adhesive handling and dispensing equipment.

An important aspect of the present invention is the means for labeling the filter element such that the user may easily select and identify an appropriate filter element for a particular application. To this end, the mass of adhesive 72 preferably includes color coding and/or alpha-numeric character(s), such as indicated generally at 83 in FIG. 1. The color and characters provide the user with appropriate information to facilitate the easy identification and selection of a filter element. For example, according to one form of the present invention, a colored dye or pigment can be introduced into the adhesive before the adhesive is applied to the filter element and cured. The color of the resulting adhesive could correspond to a particular characteristic of the filter element, for example the efficiency rating of the filter. The color could of course correspond to other structural or functional characteristic of the element, such as the chemical resistivity, temperature rating, sizing, etc., as necessary. The dye or pigment is easily introduced into the adhesive in liquid form before it is applied to the filter element and typically does not effect the cure rate or set time of the adhesive. The amount of dye or pigment necessary for the particular application can vary, but it is preferred that the dye or pigment provides a generally uniform color throughout the adhesive. Appropriate dyes and pigments which can be introduced into the adhesive are commercially-available and are known to those skilled in the relevant art.

Alternatively, after the adhesive is applied to the filter element and cured, a layer of a paint or dye can be applied along the exterior surface of the adhesive. Again, the paint (or dye) for this application is commercially-available, and is easily applied using conventional techniques. The first technique of introducing a dye or pigment into the adhesive, however, is preferred so as to simplify the manufacturing process.

After the adhesive is cured, the seam seal can be imprinted with alpha-numeric character(s) relating to other structure or performance characteristics of the filter element, for example the model number, trade/designation mark, etc. for the filter element. The characters can be printed along the entire length of the adhesive, although typically only a portion of the length is needed. One preferred technique for printing the character(s) on the adhesive is with a $CO_2$ or YAG laser marking machine. Such machines are conventional machines known by those skilled in the art for applying characters on a wide variety of surfaces. Other conventional techniques could or course be used, and in general, the type of marking technique is dependent upon the type of adhesive being marked and the desired appearance of the characters on the adhesive. The smooth exterior surface of the adhesive facilitates the marking process and provides for a generally neat and finished appearance. Typically no additional steps are necessary to protect the character(s) on the adhesive as the laser etched characters do not significantly degrade during use of the filter element. Of course, additional transparent protective layers can be provided across the etched surface of the adhesive, if desired, and as should be known to those skilled in the art. It should be noted that the laser etching step is typically performed after the end caps are attached to the filter element, which will be described below.

Figure 3:
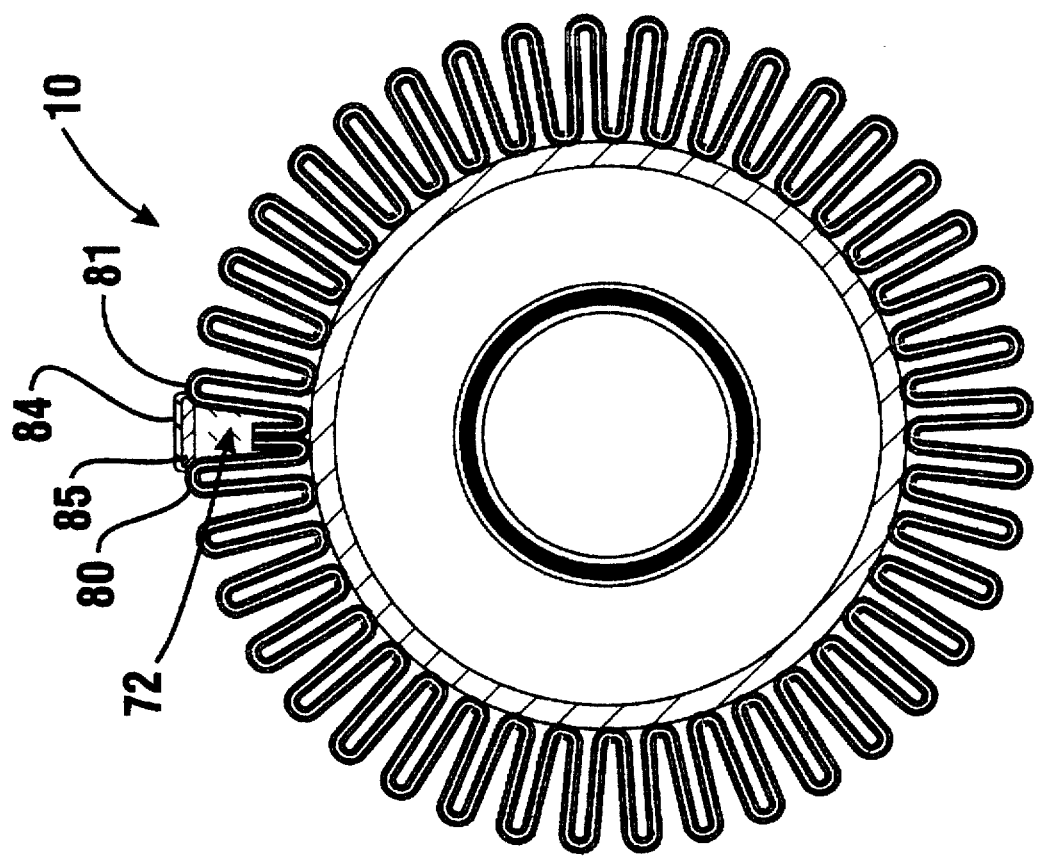
FIG. 3 is a cross-sectional similar to FIG. 2, illustrating a second form of the present invention.

According to another form of the present invention, a strip of material containing the labeling information can be applied along the exterior surface of the adhesive. Referring now to FIG. 3, the strip 84 is applied axially along the length of the adhesive mass from one end of the filter element to the other. The strip is preferably about as wide as the circumferential distance between the adjacent pleat peaks 80, 81, and can be preprinted with a color and/or with alpha-numeric character(s) relating to the structure or performance characteristics of the filter element. Preferably, the strip is formed from an appropriate mesh-type material, such as nylon, which allows the underlying adhesive 72 to wick through the strip when the adhesive is still warm (i.e., prior to being cured or set when the adhesive is still in a liquid or fluid state). In this case, the adhesive 72 is preferably transparent when cured, and as such, the portion of the adhesive which wicks through the strip provides a cover or seal 85 across the surface of the strip. The seal prevents the strip, or any color or characters on the strip, from wearing off or degrading during use of the filter element. The seal also provides a neat and finished appearance for the seam seal. In addition, the strip creates a uniform bond to the underlying adhesive, which prevents air pockets from forming along the surface of the adhesive, thereby further increasing the quality of the side seam seal. Alternatively, the strip can be applied after the adhesive has cured. In this case, the strip can have an additional mass of adhesive (e.g., epoxy, pressure-sensitive adhesive, etc.) on the lower surface thereof which bonds the strip to the cured adhesive 72, or can be attached by other means. An outlet layer of an appropriate transparent material, for example a resin, can then be applied along the strip to seal and protect the strip during use. In any case, the strip of material (with or without additional adhesive) can be applied using conventional dispensing techniques, which should be known to those skilled in the art.

After the side seam seal is disposed along the side edges of the filter media, upper and lower end caps, indicated at 90 and 92 in FIG. 1, are applied at opposite ends of the filter element. Conventional adhesive (e.g., heat-curable adhesive, two-part epoxy, etc.) is deposited between the end caps and the filter material to provide a strong bond for the end caps. The upper and lower end caps 90, 92 are preferably formed from conventional materials, such as metal or plastic, and have an annular, cup-shaped configuration which encloses the end surfaces of the filter element. At least one of the end caps, for example upper end cap 90, has a central opening 94 (see FIG. 2) which is designed to receive an appropriate portion of the filter housing (e.g., a cylindrical air outlet member) when the filter element is mounted for use, as is conventional in the art. An 0-ring-type seal 96 can be located within an inwardly-directed annular groove formed by annular flange 98 (see FIG. 1) on upper end cap 90 (as well as lower cap 92) for sealing against the filter housing.

Thus, as described above, the present invention provides a novel and unique filter element, and a technique for manufacturing a filter element, which provides a reliable side seam seal to prevent leak paths from forming along the seam. In addition, the present invention facilitates identifying and selecting an appropriate filter element for a particular application. Adding color to the adhesive simplifies the manufacturing process in that it does not require extra steps to provide circumferential color bands around the filter element, as in the past. The invention also protects the color and characters along the seam and prevents them from wearing off or degrading during use. The alpha-numeric character(s) along the seam seal are easy to read and, along with the colored adhesive, take advantage of a heretofore under-utilized location on the filter element.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of me invention as set forth in the appended claims. For example, while the above filter element is described as having a single side seam seal, it is of course within the scope of the present invention to provide multiple side seam seals, each spaced circumferentially apart from one another, if the application so warrants. One type of filter which might use multiple seals is a filter for trucks or large off-road vehicles which can require filter elements as long as 39 inches. In such applications, multiple side seam seals as described in the present invention might be necessary or useful. In any case, this is only one anticipated variation and others may be provided without departing from the scope or spirit of the present invention.

What is claimed is:

1. A filter element, comprising:

a cylindrical support tube, filter material surrounding said support tube, said filter material having pleats extending axially along the support tube, said pleats having open ends spaced away from said support tube, bight ends disposed between said open ends and said support tube, and sidewalls extending between said bight ends and said open ends; said open ends, bight ends and sidewalls defining outwardly-opening pleated cavities between adjacent pleats, each of said sidewalls of said pleats having an inwardly-directed surface facing inwardly into a respective pleat cavity, and an outwardly-directed surface facing away from said pleat cavity, said filter material extending circumferentially around said support tube from a first axially-extending side edge to a second axially-extending side edge, said first side edge being disposed adjacent said second side edge such that one outwardly-directed surface from one pleat sidewall at said first side edge is adjacent another outwardly-directed surface from another pleat sidewall at said second side edge of said filter material;

a mass of adhesive disposed in the pleat cavities defined by said one pleat and said adjacent pleat such that said mass of adhesive forms a band extending along the axial length of said filter material to encapsulate said first and second edges of said filter media and retain said first and second side edges together, and means for labeling said band of adhesive to facilitate identifying and selecting a filter element having certain performance and structural characteristics, said labeling means being unitary with said adhesive and disposed only between said one pleat sidewall and said other pleat sidewall.

2. The filter element as in claim 1, wherein said means for labeling said band includes providing a color with said band.

3. The filter element as in claim 2, wherein said means for labeling said band includes a colored dye or pigment dispersed throughout said adhesive.

4. The filter element as in claim 3, wherein said means for labeling further includes alpha-numeric character(s) applied directly to said adhesive along an exterior surface of said adhesive.

5. The filter element as in claim 2, wherein said means for labeling said band includes a color introduced as a dye or pigment into said adhesive.

6. The filter element as in claim 2, wherein said means for labeling said band includes a color applied as a layer directly to an exterior surface of the adhesive.

7. The filter element as in claim 1, wherein said means for labeling includes a strip of material disposed along an exterior surface of said adhesive in surface-to-surface contact with the adhesive along the entire longitudinal extent of the strip.

8. The filter element as in claim 7, wherein said strip of material includes a color on an exterior surface thereof.

9. The filter element as in claim 7, wherein said strip further includes alpha-numeric characters applied along the exterior surface of said strip.

10. The filter element as in claim 7, wherein said strip of material includes a color on an exterior surface thereof, and alpha-numeric characters applied along the exterior surface of the strip.

11. The filter element as in claim 10, wherein said filter material comprises a multi-layer structure, with an outer layer of said structure comprising a steel mesh, and said adhesive fills said pleat cavities to substantially cover the steel mesh along the pleat peaks.

12. The filter element as in claim 1, wherein said pleats have peak s at the open ends of the pleats, and said mass of adhesive fills said pleat cavities up to about the level of the pleat peaks to provide a smooth exterior surface.

13. The filter element as in claim 1, wherein said means for labeling said band includes alpha-numeric characters applied directly to an exterior surface of the adhesive.

14. A filter element, comprising:

a cylindrical support tube, filter material surrounding said support tube, said filter material having pleats extending axially along the support tube, said pleats having open ends spaced away from said support tube, bight ends disposed between said open ends and said support tube, and sidewalls extending between said bight ends and said open ends; said open ends, bight ends and sidewalls defining outwardly-opening pleated cavities between adjacent pleats, each of said sidewalls of said pleats having an inwardly-directed surface facing inwardly into a respective pleat cavity and an outwardly-directed surface facing away from said pleat cavity, said filter material extending circumferentially around said support tube from a first axially-extending side edge to a second axially-extending side edge, said first side edge being disposed adjacent said second side edge such that one outwardly-directed surface from one pleat sidewall at said first side edge is adjacent another outwardly-directed surface from another pleat sidewall at said second side edge of said filter material, a mass of adhesive disposed in the pleat cavities defined by said one pleat and said adjacent pleat such that said mass of adhesive forms a band extending along the axial length of said filter material to encapsulate said first and second edges of said filter media and retain said first and second side edges together, and means for labeling said band of adhesive to facilitate identifying and selecting a filter element having certain performance and structural characteristics, said means for labeling including a strip of material disposed along an exterior surface of said adhesive, wherein said adhesive is a curable adhesive, and said strip is a mesh-type material which allows a portion of said adhesive to wick through the strip when the adhesive is of a sufficient fluidity prior to being cured, said portion of said adhesive providing a transparent seal across the exterior of said strip surface after said adhesive is cured.

15. A filter element, comprising:

a cylindrical support tube, filter material surrounding said support tube, said filter material having pleats extending axially along the support tube, said pleats having open ends spaced away from said support tube, bight ends disposed between said open ends and said support tube, and sidewalls extending between said bight ends and said open ends, said open ends, bight ends and sidewalls defining outwardly-opening pleated cavities between adjacent pleats, each of said sidewalls of said pleats having an inwardly-directed surface facing inwardly into a respective pleat cavity, and an outwardly-directed surface facing away from said pleat cavity, said filter material extending circumferentially around said support tube from a first axially-extending side edge to a second axially-extending side edge, said first side edge being disposed adjacent said second side edge such that one outwardly-directed surface from one pleat sidewall at said first side edge is adjacent another outwardly-directed surface from another pleat sidewall at said second side edge of said filter material, a mass of adhesive disposed in the pleat cavities defined by said one pleat and said adjacent pleat such that said mass of adhesive forms a band extending along the axial length of said filter material to encapsulate said first and second edges of said filter media and retain said first and second side edges together; and means for labeling said band of adhesive to facilitate identifying and selecting a filter element having certain performance and structural characteristics, said means for labeling including a strip of material disposed along an exterior surface of said adhesive, said strip including a color on an exterior surface thereof, and alpha-numeric characters applied along the exterior surface of the strip, wherein said adhesive is a curable adhesive, and said strip is a mesh type material which allows a portion of said adhesive to wick through the strip when the adhesive is of a sufficient fluidity prior to being cured, said portion of said adhesive providing a transparent seal across the exterior surface of said strip after said adhesive is cured.

16. A filter element, comprising:

cylindrical filter material having end caps supporting opposite ends of said material, said filter material having pleats extending axially between said end caps, said pleats having outwardly-opening pleat cavities, said filter material extending circumferentially from a first axially-extending side edge of one pleat to a second axially-extending side edge of another pleat, said first side edge being disposed adjacent said second side edge such that said one pleat and said other pleat are adjacent one another, and a mass of adhesive disposed in a band along the axial length of the filter element along said first and second side edges between said one pleat and said other pleat such that said mass of adhesive encapsulates and retains said first and second side edges together and has a surface portion which is visible along the exterior of the filter element, and said mass of adhesive including selecting and identifying information unitary with the surface portion and disposed only between said one pleat and said other pleat to facilitate identifying and selecting a filter element having certain performance and structural characteristics.

17. The filter element as in claim 16, wherein said information comprises a color associated with said adhesive, said color being visible along the surface portion of the adhesive and corresponds to a particular structural or functional characteristic of the filter element.

18. The filter element as in claim 17, wherein a dye or pigment is dispersed throughout said adhesive to provide said color.

19. The filter element as in claim 17, wherein said information includes a color introduced as a dye or pigment into said adhesive.

20. The filter element as in claim 17, wherein said information includes a color applied as a layer directly to an exterior surface of the adhesive.

21. The filter element as in claim 16, wherein a strip of material is applied axially along the length of said adhesive band only between said one pleat and said other pleat, said strip of material including said information on an exterior surface of the strip relating to a structural or functional characteristic of the filter element.

22. The filter element as in claim 21, wherein the adhesive is a curable adhesive, and the strip is a mesh-type material which allows a portion of said adhesive to wick through the strip when the adhesive is of a sufficient fluidity prior to being cured, said portion of said adhesive providing a transparent seal across an exterior surface of said strip after said adhesive is cured.

23. The filter element as in claim 22, wherein the strip of material includes a color on an exterior surface thereof, and alpha-numeric characters applied along the exterior surface of the strip.

24. The filter element as in claim 16, wherein said information includes alpha-numeric characters imprinted directly on the exterior surface portion of the adhesive, said alpha-numeric characters corresponding to a structural or functional characteristic of the filter element.

25. A filter element, comprising:

cylindrical filter material having end caps supporting opposite ends of said material, said filter material having pleats extending axially between said end caps, said pleats having outwardly-opening pleat cavities, said filter material extending circumferentially from a first axially-extending side edge associated with a first sidewall of one pleat to a second axially-extending side edge associated with a second sidewall of another pleat, said first sidewall being disposed in facing relation to said second sidewall, and a mass of adhesive disposed in a band along the axial length of the filter element between said first and second sidewalls such that the mass of adhesive retains said side edges together and has a surface portion which is visible along the exterior of the filter element, and said mass of adhesive including selecting and identifying information unitary with the surface portion and disposed only between said first and second sidewalls to facilitate identifying and selecting a filter element having certain performance and structural characteristics.

26. The filter element as in claim 25, wherein said mass of adhesive entirely fills the pleat cavities defined by said first and second sidewalls.

27. The filter element as in claim 25, wherein said first and second sidewalls are in adjacent facing relation to each other, and the surface portion of said mass of adhesive is uninterrupted between said first and second sidewall.

28. The filter element as in claim 25, wherein said information includes a color introduced as a dye or pigment into said adhesive.

29. The filter element as in claim 25, wherein said information includes a color applied as a layer directly to an exterior surface of the adhesive.

30. The filter element as in claim 25, wherein said information includes alpha-numeric characters applied directly to an exterior surface of the adhesive.

31. The filter element as in claim 25, wherein a strip of material is disposed along an exterior surface of said adhesive in surface-to-surface contact with the adhesive along the entire longitudinal extent of the strip, said information being visible along an exterior surface of the strip.

32. A method for assembling a filter element, comprising the steps of:

providing a central support tube, providing a length of filter media having upper and lower end edges, a pair of side edges, and pleats extending substantially parallel to one another from the upper edge to the lower edge and across the length of filter media from side edge to side edge, wrapping the filter media around the central support tube such that the pleats extend axially along the tube and the side edges are adjacent one another along a seam, each of said side edges of said filter media having a surface directed outwardly from a respective pleat, said outwardly-directed surface of one pleat from one side edge being in adjacent, face-to-face relation with the outwardly-directed surface of another pleat from the other side edge, such that the adjacent pleats define a pair of adjacent pleat cavities, and depositing a mass of adhesive in said adjacent pleat cavities along the length of the filter media such that the adhesive extends across the seam and retains the side edges together, labeling said adhesive only between said outwardly-directed surfaces of said adjacent pleats to facilitate identifying and selecting a particular filter element from a plurality of filter elements with certain structural and functional characteristics.

33. The method as in claim 32, further including the step of applying color directly to said adhesive corresponding to the structural and functional characteristics.

34. The method as in claim 33, further including the step of applying alpha-numeric characters directly to said adhesive corresponding to the structure and functional characteristics.

35. The method as in claim 33, further including the step of introducing the color as a dye or pigment into said adhesive, said color corresponding to the structure and functional characteristics.

36. The method as in claim 33, further including the step of applying the color as a layer directly to an exterior surface of the adhesive, said color corresponding to the structure and functional characteristics.

37. The method as in claim 32, further including the step of applying alpha-numeric characters directly to an exterior surface of the adhesive, said alpha-numeric characters corresponding to the structure and functional characteristics.

38. The filter element as in claim 32, further including the step of applying a strip of material along an exterior surface of said adhesive in surface-to-surface contact with the adhesive along the entire longitudinal extent of the strip, and labeling an exterior surface of the strip to facilitate identifying and selecting a particular filter element from a plurality of filter elements with certain structural and functional characteristics.

* * * * *